No. 864,955. PATENTED SEPT. 3, 1907.
E. CRAIG.
BOX BLANK MACHINE.
APPLICATION FILED AUG. 22, 1906.

No. 864,955. PATENTED SEPT. 3, 1907.
E. CRAIG.
BOX BLANK MACHINE.
APPLICATION FILED AUG. 22, 1906.

No. 864,955. PATENTED SEPT. 3, 1907.
E. CRAIG.
BOX BLANK MACHINE.
APPLICATION FILED AUG. 22, 1906.

UNITED STATES PATENT OFFICE.

EDWARD CRAIG, OF ST. JOSEPH, MICHIGAN, ASSIGNOR TO WILLIAM P. HEALY, OF CHICAGO, ILLINOIS.

BOX-BLANK MACHINE.

No. 864,955.  Specification of Letters Patent.  Patented Sept. 3, 1907.

Application filed August 22, 1906. Serial No. 331,581.

*To all whom it may concern:*

Be it known that I, EDWARD CRAIG, a citizen of the United States of America, and a resident of St. Joseph, Michigan, have invented a certain new and useful Improvement in Box-Blank Machines, of which the following is a specification.

My invention relates to machinery for use in making wire-bound and cleat-reinforced box-blanks.

In certain respects, my invention is in the nature of an improvement on the box-blank machine disclosed in Patent No. 815,197 issued March 13, 1906.

Generally stated, the object of my invention is the provision of an improved and highly efficient machine for making wire-bound and cleat-reinforced box-blanks of this particular character.

Special objects of my invention are the provision of improved endless, traveling link-belts for supporting and guiding the cleats of the blanks; the provision of improved means for varying the distance between the two endless, traveling link-belts or cleat-carriers, for the purpose of varying the width of the blanks; the provision of a novel and efficient arrangement for readily tightening the endless, traveling link-belts or combined cleat guides and carriers, adapted also to permit lengthening and shortening of the endless traveling link-belts or chains; the provision of improved means for holding the blank materials down upon the traveling link belts or carriers before the same pass below the staplers, which are employed for driving staples to fasten the materials together; the provision of improved means for permitting a variation in the length of the blanks,—that is to say, for permitting the use of cleats of different length, and for properly spacing the same apart endwise in the direction of their longitudinal travel through the machine; the provision of improved means for holding the blanks down upon the traveling chains or link-belts after the same have passed out from under the said staplers; the provision of improved means for operating the said traveling link-belts or combined cleat guides and carriers; and the provision of certain details and features of improvement and combinations tending to increase the general efficiency and serviceability of a box-blank machine of this particular character.

To the foregoing and other useful ends, my invention consists in matters hereinafter set forth and claimed.

In the accompanying drawings.

Figure 1:
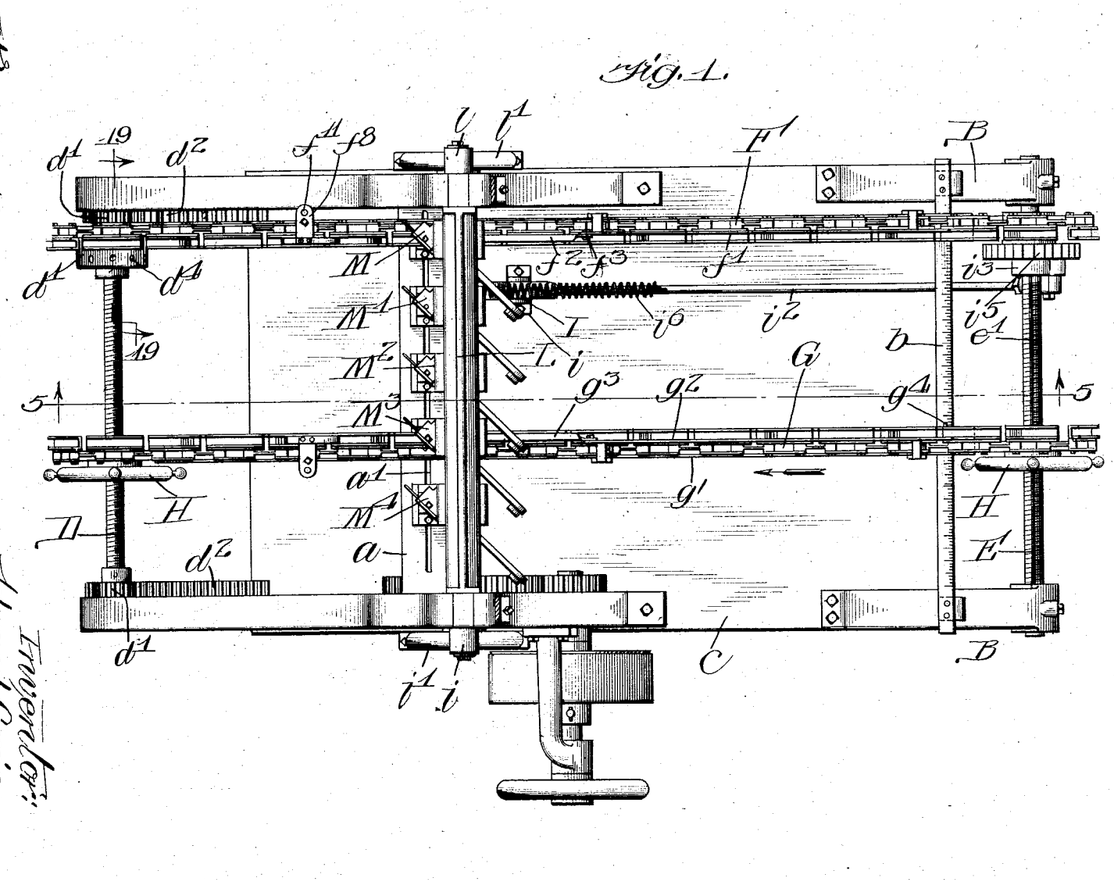
—Figure 1 is a plan of a box-blank machine embodying the principles of my invention.
Figure 2:
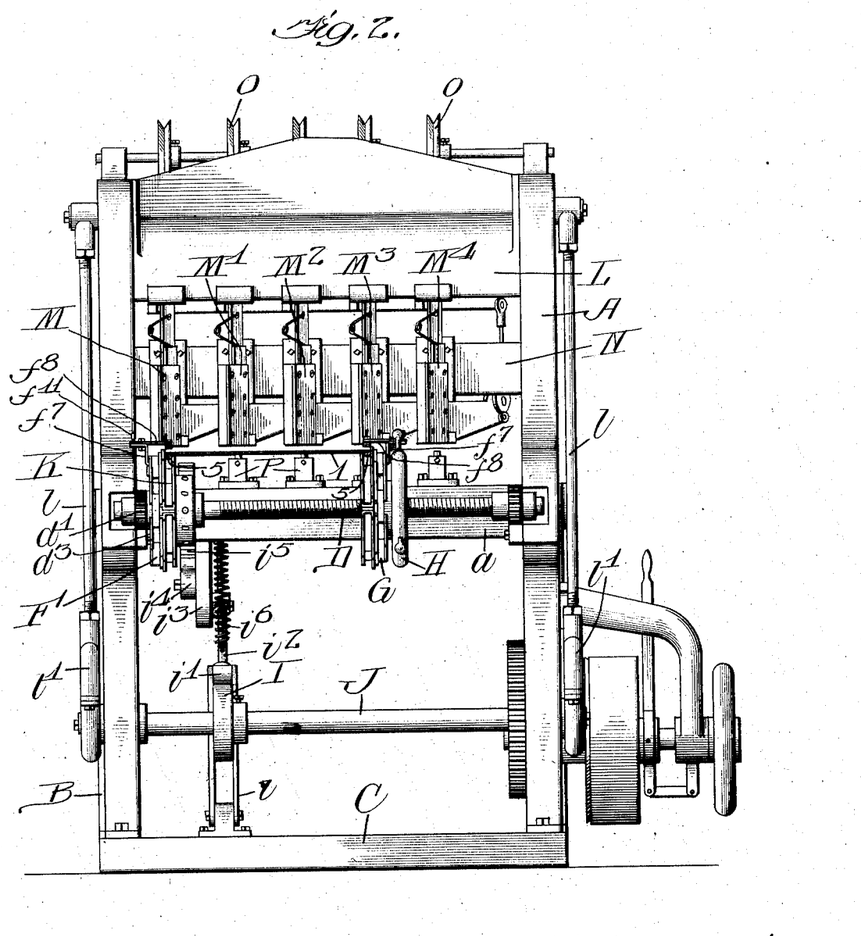
Fig. 2 is an end elevation of the said machine.
Figures 3, 4:
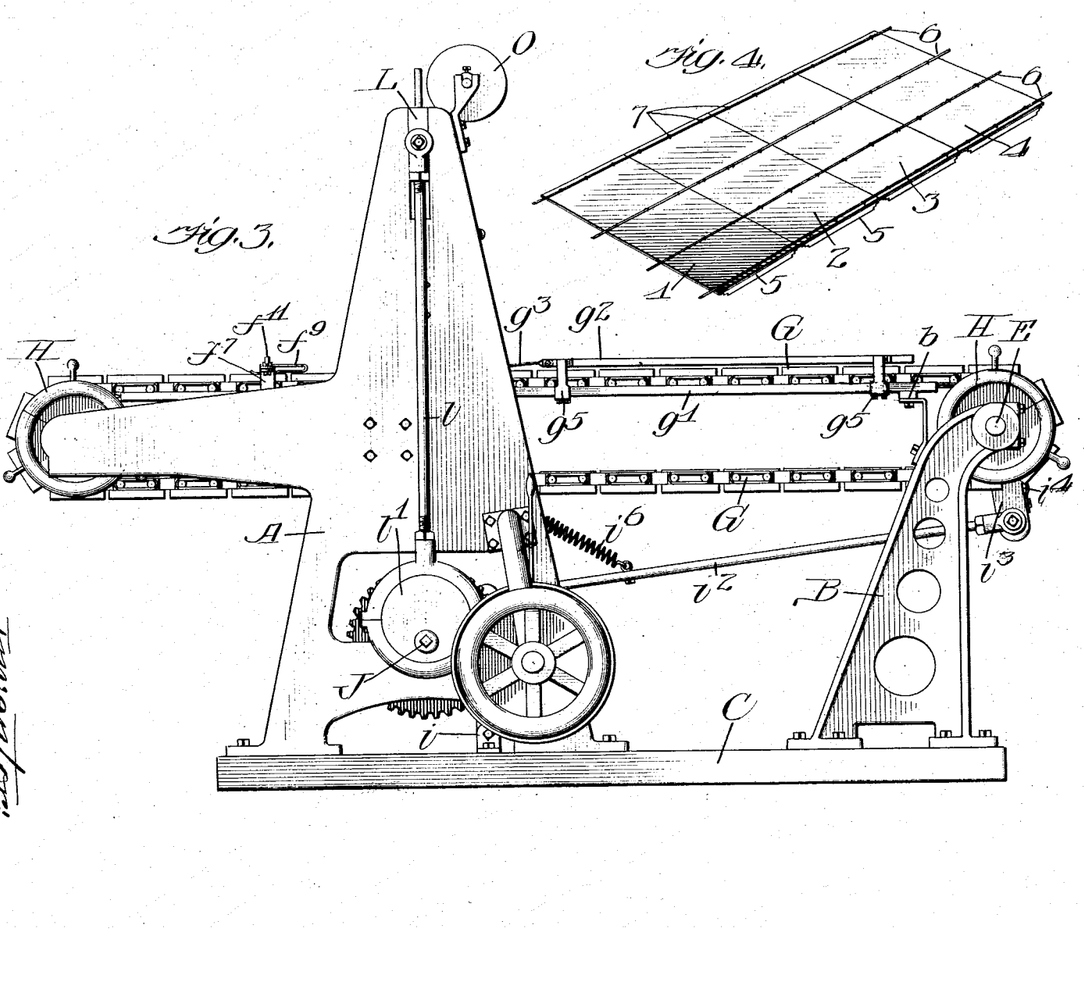
Fig. 3 is a side elevation of the said machine.
Fig. 4 is a perspective view of a finished box-blank.

Referring now to Fig. 4, it will be seen that the box blank to be made comprises four sheets of veneer, 1, 2, 3, 4, longitudinally-extending cleats 5 secured to the lower surfaces of said sheets of veneer and extending along the side edges of the blank, together with binding wires 6 secured to the top or upper surface of the blank to flexibly connect together the four sections thereof, it being understood that staples 7 are driven so as to straddle the said wires, and that the staples which secure the outermost wires in place are also employed for securing the cleats to the sheets of veneer.

Figures 15, 16:
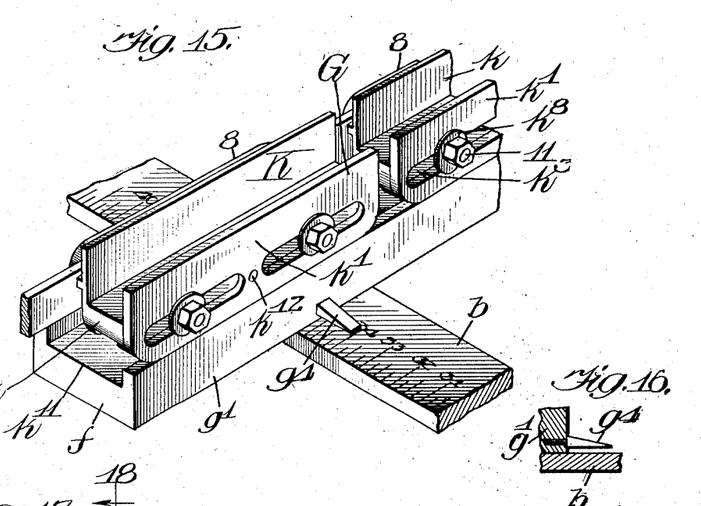
Fig. 15 is a detail perspective view showing a portion of one of the endless link-belts or traveling cleat-carriers, a portion of the guide in which the same slides, and a portion of the transverse supporting bar for the said guide, said supporting bar being graduated with reference to an indicating pointer on the said guide, whereby accurate variation may be obtained in the width of the blanks.
Fig. 16 is a detail sectional view showing the said pointer on the chain guide, and showing a portion of the graduated bar on which the guide rests.
Figures 17, 18, 22:
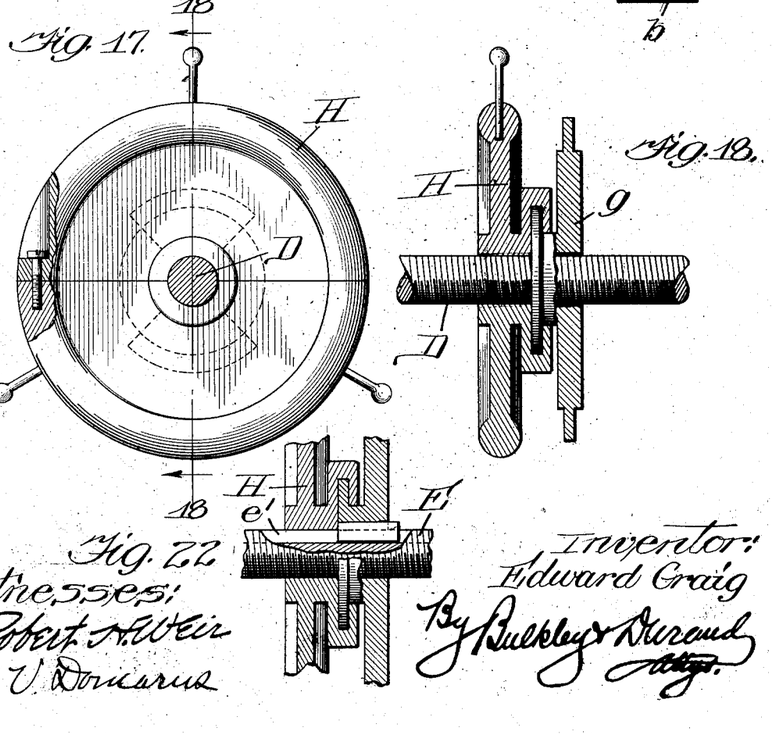
Fig. 17 is a detail side elevation of one of the hand wheels for effecting a lateral adjustment of one of the endless traveling link-belts or chains.
Fig. 18 is a detail sectional view on line 18—18 in Fig. 17.
Fig. 22 is a detail sectional view of the rotary sprocket shaft and hand wheel.
Figures 19, 20:
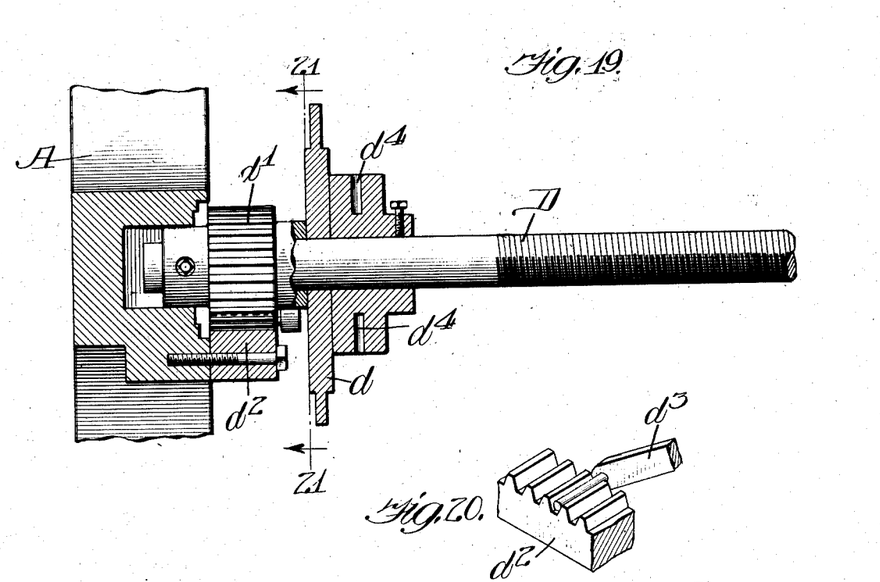
Fig. 19 is a detail longitudinal sectional view of one of the devices for effecting a tightening of the link belts.
Fig. 20 is a detail perspective of the locking dog and a portion of the rack of one of said devices.

My improved machine for making a blank of the foregoing general character comprises a main frame or body A, and an auxiliary or supplemental frame or body B, each of said frames or bodies consisting preferably of a couple of upright members, all rigidly connected together by a base or flooring C. The transverse sprocket-wheel shafts D and E are mounted at opposite ends of the machine and supported for rotation in suitable bearings carried by the said upright members of the two frames or bodies. Sprocket wheels, such for example as the sprocket wheel $d$, (shown in Fig. 5) are mounted upon the said shafts, and the two sprockets of one shaft are connected with the two sprockets of the other shaft by means of a couple of parallel and endless link-belts or chains F and G. It will also be seen, at this juncture, that the two upright members of the main frame A are connected by a transverse supporting beam or bar $a$, the same being provided with a longitudinal slot $a'$. The graduated cross bar $b$ connects together the two uprights of the auxiliary or supplemental frame B, and has its upper surface graduated in inches and fractions thereof, as shown more clearly in Fig. 15. A stationary, longitudinally-disposed guide-bar or trough $f$ is supported upon the cross bars $a$ and $b$, and provided on its upper surface with a groove or trough in which the chain or link belt F is supported and travels along during the operation of the machine. The two sprocket wheels provided for the chain or link belt G, as, for example, the sprocket $g$ shown in Fig. 18, are each provided with a hand wheel H for effecting lateral adjustment of the chain or link belt G, as will hereinafter more fully appear. This link belt or chain G is supported in a laterally-movable trough or guide bar $g'$, which latter rests upon the transverse supporting bars $a$ and $b$, and which is similar to the guide bar $f$. The said guide bars $f$ and $g'$ are provided with the longitudinally-disposed guards $f'$ and $g^2$, which extend longitudinally above the two endless traveling link-belts, and which are provided at their forward ends with the pivoted holders $f^2$ and $g^3$.

Figures 8, 9, 10:
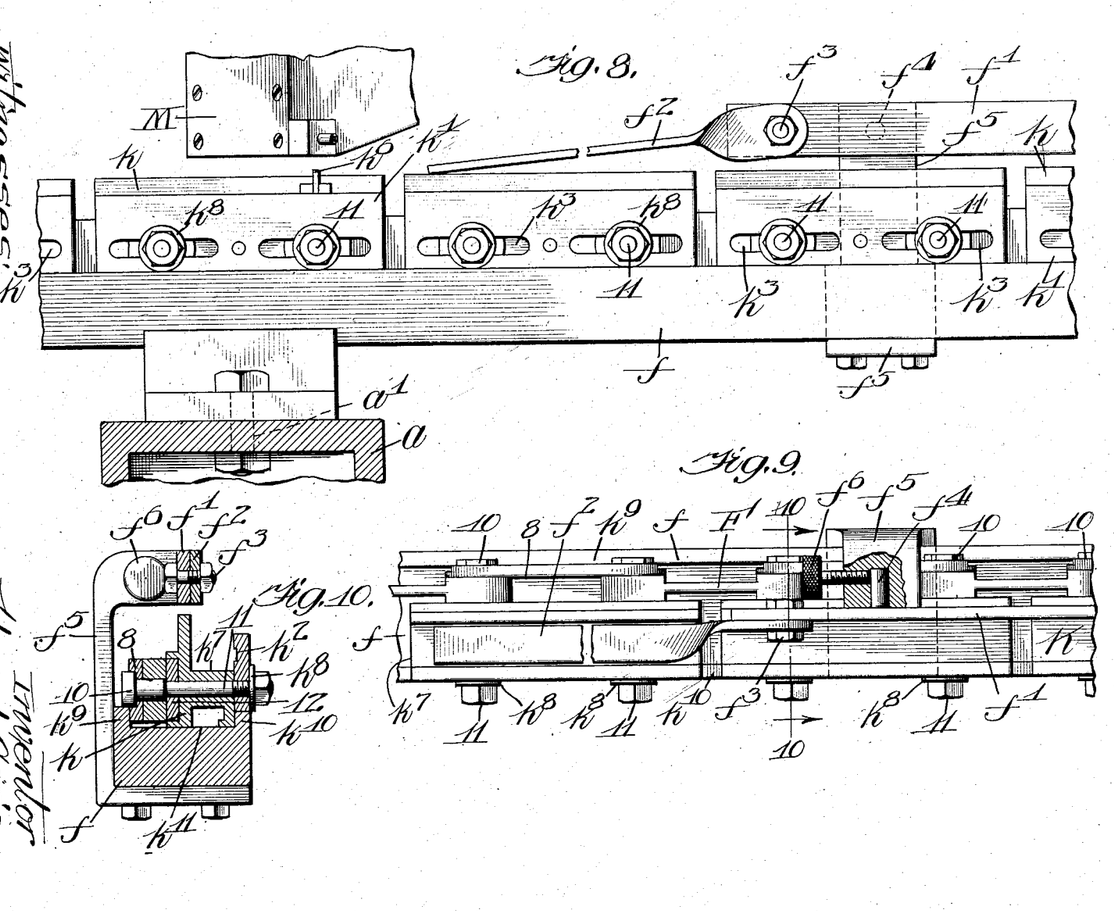
Fig. 8 is a detail sectional view showing the inner side of a portion of one of the endless chains or link-belts, and showing the device for holding the stock or materials in place before the same pass below the staplers.
Fig. 9 is a plan of the devices shown in Fig. 8.
Fig. 10 is a cross section on line 10—10 in Fig. 9.

Referring to Figs. 8 and 9, which show the pivoted holder $f^2$, it will be seen that the same is pivotally mounted at $f^3$, the pivotal connection being provided by a bolt which can be tightened or loosened to hold the holder $f^2$ in any desired position. The guard $f'$ is provided with pins $f^4$, which enter the brackets $f^5$ secured to the guide bar $f$. Thumb screws $f^6$ are inserted in said brackets and adapted to bear upon the pins $f^4$ to removably hold the same in place. With this arrangement, the guards $f'$ and $g^2$ can be inserted and removed, it being understood that the two guards are constructed in the same manner.

Figures 11, 12:
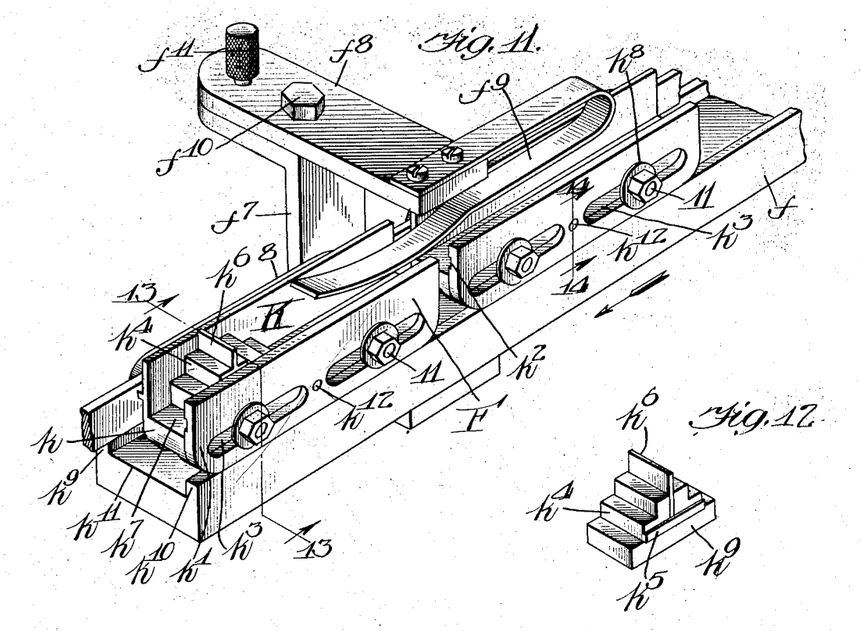
Fig. 11 is a detail perspective view showing a portion of one of the link belts, a portion of the guide in which the link belt travels or slides, and showing also one of the devices for holding the blanks in place after the same pass out from under the staplers.
Fig. 12 is a detail perspective view of one of the miter blocks for spacing the cleats apart endwise.
Figure 13:
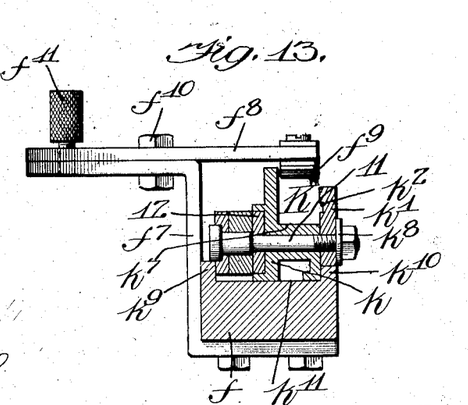
Fig. 13 is a detail cross section on line 13—13 in Fig. 11.
Figure 14:
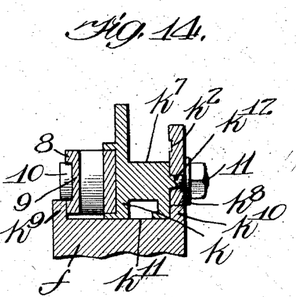
Fig. 14 is a detail cross section on line 14—14 in Fig. 11.

Referring to Fig. 11, it will also be seen that the guide bar $f$ is provided with a bracket $f^7$, which supports a pivoted plate $f^8$, and upon which latter a spring holder $f^9$ is secured in place to hold the blanks in place after they pass out from under the staplers. The said pivoted plate $f^8$ is secured in place by a bolt or screw $f^{10}$, and is held in its adjusted position by a thumb screw $f^{11}$. With this arrangement, the thumb screw $f^{11}$ can be loosened, and the spring holder $f^9$ and its supporting plate can then be swung around to a position at one side of the link belt F. It will be seen that the guide bars $f$ and $g'$ are secured by bolts to the cross bars $a$—$a$. Such bolts extend through the slot $a'$, whereby the chain G can be shifted sidewise by a rotation of the hand wheels H. In this connection, it will be seen that the shafts or transverse sprocket supports D and E are screw-threaded in order to permit the rotation of the hand wheels H to remove the chain G sidewise for the purpose of varying the distance between the two chains or endless traveling link belts, as will hereinafter more fully appear.

Figure 21:
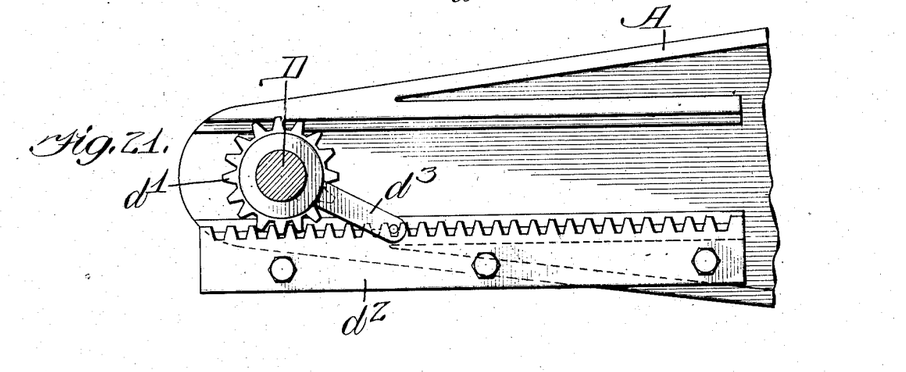
Fig. 21 is a detail vertical sectional view on line 21—21 in Fig. 19.

Should it be desired to tighten the belt or to change the length of the belt by inserting or removing links, the same can be easily accomplished by partially rotating the shaft D. Upon the ends of this shaft, pinions $d'$ are secured in place, adapted to engage the stationary racks $d^2$, which latter are parallel and secured to the side portions of the main frame or body A. A locking dog $d^3$ can be provided for one of said pinions and arranged to lockingly engage the rack upon which said pinion is supported, as shown more clearly in Fig. 21.

It will be seen that the loose sprocket wheel $d$ has an associated collar which is fastened to the shaft, and which is provided with sockets $d^4$ adapted to receive a tool for rotating the shaft D. In other words, a suitable tool can be inserted in these sockets, and the shaft D can then be rocked or partially rotated for the purpose of causing the pinions $d'$ to travel along their respective racks, thus varying the distance between the shafts D and E. Thus, with this arrangement, the two parallel link-belts or chains can be easily or readily tightened or loosened, or the length of the same can be readily varied according to the requirements of different kinds of work.

Figure 5:
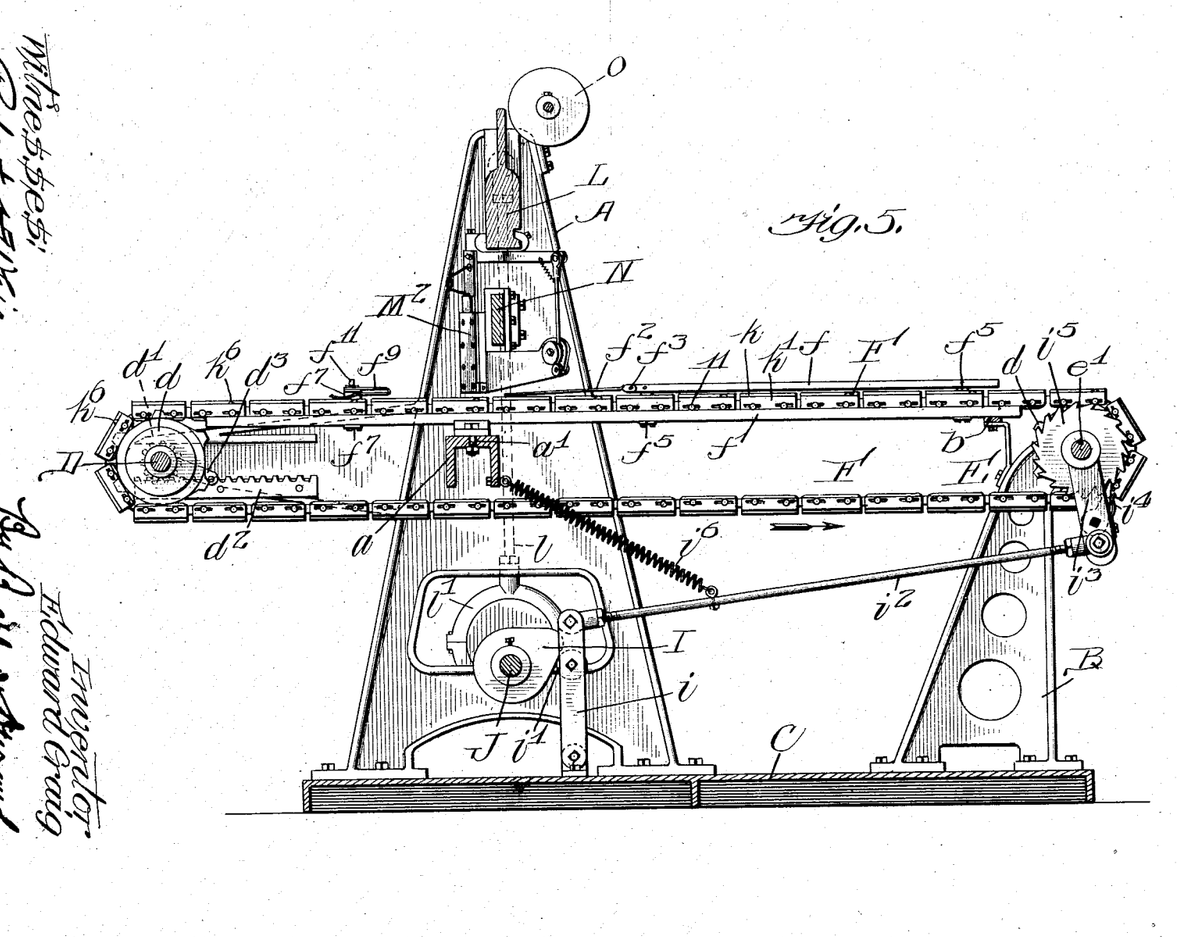
Fig. 5 is a longitudinal section on line 5—5 in Fig. 1.
Figures 6, 7:
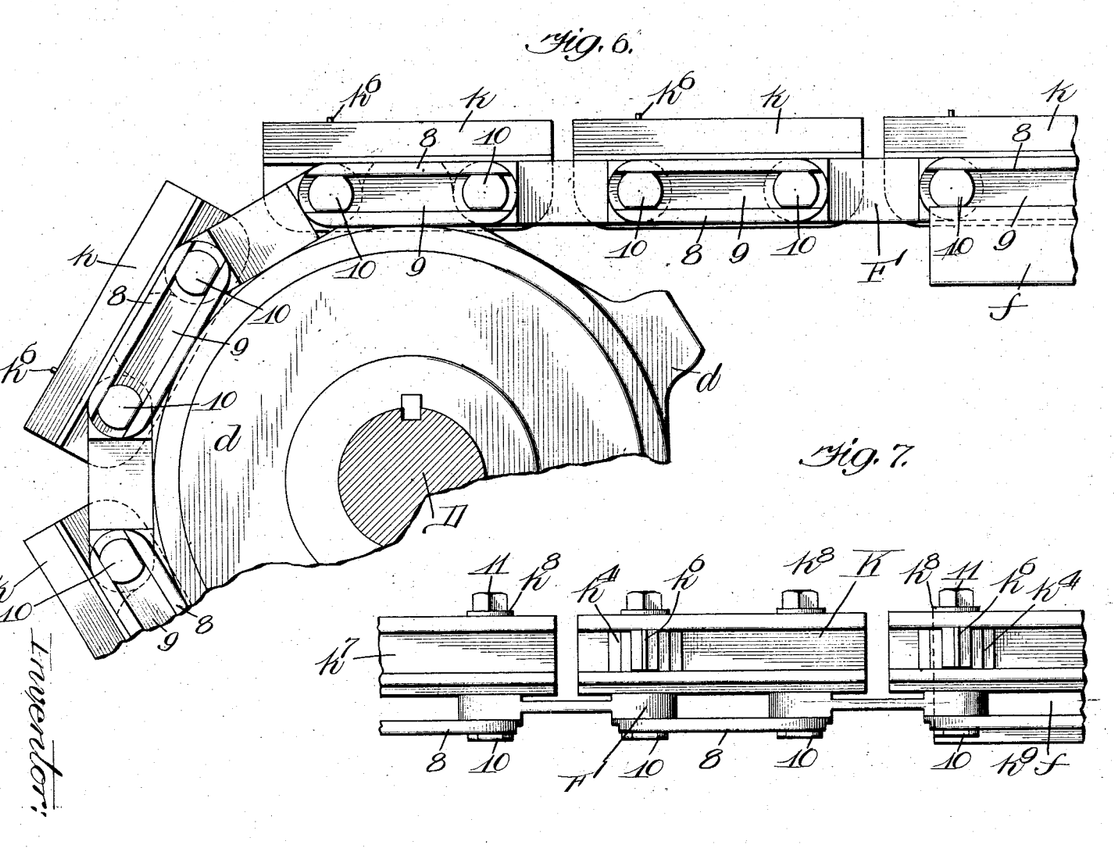
Fig. 6 is a detail side elevation of a portion of one of the traveling link-belts or chains, showing also a portion of one of the sprockets
Fig. 7 is a plan of a portion of the chain or link-belt shown in Fig. 6.

Referring more particularly to Fig. 5, it will be seen that the two endless traveling link-belts are given an intermittent traveling motion by means of an automatic feed arrangement, consisting of a cam I on the main shaft J, a pivoted lever $i$ provided with a roll $i'$ adapted to be engaged by the said cam; a link or rod $i^2$ connecting the upper end of said lever with a swinging arm $i^3$, which latter carries a dog $i^4$ adapted to engage a ratchet wheel $i^5$. With this arrangement, the rotation of the shaft J causes a reciprocation of the rod $i^2$, and a consequent intermittent motion of the ratchet device provided by the ratchet wheel $i^5$ and the dog $i^4$. This intermittent motion is, of course, communicated to the shaft E, with the result that the two sprocket wheels held thereon are given an intermittent rotation, communicating such motion to the chains or link belts F and G.

It will be understood, of course, that the two sprocket wheels which are mounted on the threaded shaft D must be able to turn loosely thereon, inasmuch as this shaft does not rotate during the operation of the machine, but is only rocked or rotated for the purpose of tightening or changing the length of the two traveling link belts. When the two hand wheels H are rotated, an accurate adjustment of the chain G and its supporting guide can be obtained by means of the graduated cross bar $b$ and the pointer $g^4$ on the guide $g'$ (see Figs. 15 and 16).

It will be seen that the rod $i^2$ is actuated in one direction by the spring $i^6$, which connects the said rod with the cross bar or beam $a$.

The two traveling link belts or chains are alike, and a description of one will suffice for both. Referring, therefore, to Figs. 6 and 7, and 11 to 14, inclusive, it will be seen that the chain or link belt F is provided with outer links 8, which have longitudinal grooves 9 adapted to receive the bolt heads 10. These bolt heads are flattened at top and bottom in order to adapt them to fit into said grooves 9, as shown more clearly in Fig. 6. The bolts 11 extend through the links of the chains or link belts, to flexibly connect the same together, and also extend through the pockets or cleat carriers K. Each cleat carrier preferably comprises an inner member $k$ which is grooved on its side surface to receive an inner link 12 of the chain or belt; an outer member $k'$ which is provided on its inner surface with a longitudinal groove $k^2$, and which is also provided with longitudinal slots $k^3$, through which the said bolts extend; and a miter block $k^4$ provided with a side rib $k^5$ adapted to engage the groove $k'$. The said miter block is clamped between the two members of the pocket or cleat carrier, and is provided at each side with steps adapted to engage the step-mitered ends of the cleats. Each miter block is also provided with a thin top or upper end $k^6$ adapted to extend between the ends of the two cleats resting thereon. With this arrangement, the said miter block can be adjusted and held at any desired point between the two ends of the pocket or cleat holder K, as shown more clearly in Figs. 7 and 11, the rib $k^5$ and groove $k^2$ serving to prevent the said miter block from being raised or displaced from the bottom or floor $k^7$ of the said cleat holder. The slots $k^3$ permit endwise adjustment of the cleat holders relatively to each other and relatively to the chains or link belts; it being understood that corresponding slots are also formed in the inner members $k$ of the said cleat holders. Nuts and washers $k^8$ are applied to the outer ends of the bolts 11, whereby the cleat holders and the miter blocks are all clamped tightly to the inner sides of the two endless traveling link belts. The flattened heads or outer ends of the said bolts, by being adapted to engage the grooves 9 in the said link belts, prevent said belts from turning. Furthermore, it will be seen that these flattened bolt heads project outwardly to an extent to enable them to rest upon the outer flange $k^9$ of the trough-like guide-bar $f$. The lower edges of the outer members $k'$ rest upon the inner flange $k^{10}$ of the said trough-like guide-bar. The said cleat pockets or holders preferably rest firmly upon the bottom or floor $k^{11}$ of the said guide bar, as shown more clearly in Figs. 13 and 14. At their centers, each outer member $k'$ is provided with an opening adapted to engage a small pin $k^{12}$ inserted in or made integral with the inner member $k$, whereby the two members of each cleat pocket or holder are always accurately assembled and held together,—that is to say, relative displacement between the two members of any cleat pocket is thus prevented. In this way, each traveling link belt or chain is adapted to slide smoothly in its allotted guide bar, and is also adapted to support the cleats of the blank and carry the same forward for the purpose of advancing the blank material below the staplers; and, in addition, each traveling link belt or chain is provided with improved miter blocks for spacing the cleats apart endwise in the direction of their longitudinal travel. The distance can be varied between the miter blocks, whereby cleats of different length can be inserted in the machine for the purpose of making blanks of various shapes and sizes.

It will be understood, of course, that any suitable arrangement can be employed for driving the staples, by which the binding wires and cleats are secured to the sheets of veneer. For example, the main frame A can be provided with vertical guides for the horizontally-disposed and vertically-sliding cross-head L, which latter is operated by rods $l$ connected with eccentrics $l'$ mounted on the shaft J. As illustrated, the blank is constructed with four parallel binding wires, and for this reason the machine is shown as being provided with four staplers, M, M', M², and M³, together with a fifth or additional stapler M⁴, which latter will only be used when the width of the blanks is increased to an extent to make necessary the provision of a fifth binding wire. Anvils or clench blocks are provided for the said staplers, each clench block being mounted upon the cross beam $a$, and each clench block being held thereon by bolts which extend through the slot $a'$.

It will be understood that the usual staple drivers and formers are connected with the reciprocating cross head L, while the wire-feeding devices and anvils or loop bars are carried by the stationary cross head N, which latter is secured to the body frame A. In addition, a corresponding number of wire reels O are provided, adapted to carry the binding wires. These binding wires are led downwardly and guided beneath the staple drivers by any suitable known or approved guiding devices. In this way, the binding wires are stapled onto the blanks, and the intermittent feeding motion of the work-holder, composed of the two traveling link belts, causes the binding wires to be gradually unreeled. When a finished blank arrives at the forward or discharge end of the machine, it can be cut off, or, on the other hand, the flexibly connected blanks can be discharged one after the other, and then separated afterwards. At this juncture, it will be understood that the miter blocks in the chains or link belts are so disposed thereon that a sufficient space is insured between the opposing ends of any two blanks, whereby, when the blanks are finally severed or cut apart, there will then be sufficient length for the ends of the wires to permit twisting of the same together when the blank is finally embodied in a complete box. This spacing apart of the blanks can be accomplished by any suitable adjustment of the miter blocks, as will be readily understood. In order to permit the width of the blanks to be changed, the said staplers are adjustably mounted on the stationary and reciprocating cross heads, thus permitting lateral adjustment of the said staplers. The anvils or clench blocks P are, as previously explained, adjustably mounted on the beam or bar $a$, and are thus adapted to be moved in accordance with any adjustment which may be given their respective staplers. It will be understood, of course, that the said miter blocks prevent endwise displacement of the cleats while the machine is in operation. The drag or back pull of the binding wires is considerable, and in this way the miter blocks have the double function of spacing the cleats apart endwise and preventing the binding wires from causing endwise displacement of the cleats relatively to the chains or traveling link belts.

Each chain or link belt is not only a carrier for the cleats and veneer, but is also a traveling guide for the cleats, inasmuch as each link belt or chain is provided with means for holding the cleats against lateral displacement therefrom. In other words, the traveling work-holder, composed of the two link belts or chains, is provided with means for holding the cleats in fixed relation thereto,—that is, for preventing movement of the cleats in all directions except in an upward direction. Upward displacement of the cleats and veneer is impossible, however, owing to the provision of the aforedescribed guards and holders, which bear upon the sheets of veneer while the materials are passing through the machine.

As a further advantage, it will be seen that the provision of main and supplemental frames or bodies for the machine enables the operator to stand in close to the work-holder, and to thus conveniently load the latter with the required materials as fast as it travels along; or, if desired, the operator can stand at the end of the machine and in a position to conveniently place the cleats in the pockets or holders which are not covered by the guards $f'$ and $g^2$. The said guards $f'$ and $g^2$ are not, however, directly over the cavities or pockets of the chains or link belts, but are disposed slightly outside thereof, as shown more clearly in Fig. 10, and thus serve merely to engage the end edges of the sheets of veneer. In this way, the sheets of veneer cannot be displaced transversely or sidewise of the traveling work-holder, but are guided to the point where they are then pressed down by the pivoted holders $f^2$ and $g^3$. With this arrangement, the operator can, as previously stated, stand between the main and supplemental frames and load the materials on to the traveling work-holder at a point between the two guards $f'$ and $g^2$. When the distance between the two chains is varied for the purpose of changing the width of the blanks, the staples and their anvils or clench blocks can then be adjusted so as to bring the two outside staplers directly over the cleats held by the chains or link belts, so as to bring the intermediate staplers into correct position at points between the two chains or link belts. Before turning the hand wheels H, it will be understood, of course, that the bolt which secures the guide bar $g'$ to the beam $a$ must be loosened slightly, thus permitting said bolt to slide in the slot $a'$. When the proper adjustment has been secured, said bolt can then be tightened, although, in the arrangement shown, lateral displacement of the guide bars $g'$ is not likely to occur. No clench blocks are, of course, necessary for the staplers which operate directly over the chains or link belts, inasmuch as the staples which are driven at this point are preferably given a blind clench,— that is to say, are not driven entirely through the cleats. Should they be driven through the cleats, they will then be clenched by contact with the bottom walls of the pockets or cleat holders.

It will be seen that the hand wheel H and sprocket $g$ are both loose on the shaft D, the hand wheel gripping the shaft and the sprocket turning in the hand wheel. On the shaft E, however, the sprocket $g$ has a spline which slides in the longitudinal groove $e^1$, while the hand wheel H is loose upon the shaft. Both hand wheels are, however, threaded upon their respective shafts.

What I claim as my invention is,—

1. In a machine of the class specified, the combination of a traveling work-holder composed of a pair of endless link belts, means for operating said work-holder, and means including a pair of rack and pinion devices for use in tightening said link belts or permitting a variation in the length thereof by the insertion or removal of links, the pinions movable and the racks stationary.

2. In a machine of the class specified, the combination of a work-holder comprising a pair of endless traveling link belts, means for operating said work-holder, and means including a couple of hand wheels screwed on to a pair of threaded sprocket-wheel shafts for adjusting one link belt toward and away from the other to permit a variation in the width of the work-holder.

3. In a machine of the class specified, the combination of a work-holder composed of two parallel and endless traveling link belts, means for operating said work-holder, means including a pair of rotatable hand wheels for adjusting one link belt toward and away from the other, guides for the upper portions of the link belts and a graduated supporting bar along which the guide of the movable link belt is adjusted to accurately determine the desired distance between the two link belts, each hand wheel rotatable without rotating the other.

4. In a machine of the class specified, the combination of a work-holder comprising a plurality of endless traveling link belts, means including a couple of hand wheels screwed on to a pair of threaded sprocket-wheel shafts for adjusting one link belt toward and away from the other, means for operating said link belts in unison, and a graduated supporting bar extending transversely below said link belts and along which the movable link belt is adjusted to accurately determine any desired width for the workholder.

5. In a machine of the class specified, the combination of an endless traveling work-holder, means for operating said work-holder, and suitable means for operating upon any materials carried by said work-holder, said work-holder comprising a plurality of endless traveling link belts, each link belt provided with longitudinal pockets held end to end, each pocket consisting of inner and outer members providing a trough-like space between them, and a removable miter block in each pocket, said link belts having the links thereof connected by bolts which extend through and clamp in place the two members of each pocket.

6. In a machine of the class specified, the combination of an endless traveling work-holder, means for operating said work-holder, and suitable means for operating upon any materials carried by said work-holder, said work-holder comprising a plurality of endless traveling link-belts, each link belt provided with longitudinal pockets held end to end, each pocket consisting of inner and outer members providing a trough-like space between them, and a removable miter block in each pocket, said link belts having the links thereof connected by bolts which extend through and clamp in place the two members of each pocket, each pocket provided with longitudinal slots through which said bolts extend, whereby said pockets are adjustable longitudinally of the said link belts.

7. In a machine of the class specified, the combination of an endless traveling work-holder, means for operating said work-holder, and suitable means for operating upon any materials carried by said work-holder, said work-holder comprising a plurality of endless traveling link-belts, each link belt provided with longitudinal pockets held end to end, each pocket consisting of inner and outer members providing a trough-like space between them, and a removable miter block in each pocket, said link belts having the links thereof connected by bolts which extend through and clamp in place the two members of each pocket, each miter block being provided with a rib, and each pocket having its outer member provided with a longitudinal groove adapted to engage said rib, whereby said miter blocks are adjustable longitudinally of their respective pockets without danger of upward displacement therefrom.

8. In a machine of the class specified, the combination of a traveling work-holder, staplers for operating on any materials carried by said work-holder, stationary supports, plates pivoted upon said supports, set screws applied to said pivoted plates to adjustably hold the same in operative position relatively to said supports, and spring holders mounted on said plates and adapted to yieldingly bear upon said materials just after passing from below said staplers.

9. In a machine of the class specified, the combination of an endless traveling work-holder, sprockets over which said work-holder travels, a shaft for the sprockets at one end of the work-holder, a pair of stationary racks, pinions secured to the ends of said shaft, adapted to engage and travel upon said racks, and means on said shaft for rocking or partially rotating said pinions for the purpose of either tightening or loosening the link belts or permitting a variation in the length thereof by the insertion or removal of links.

10. In a machine for making wire-bound and cleat-reinforced box-blanks, the combination of a traveling work-holder, means for operating said work-holder, and miter blocks on said work-holder adapted to space the cleats apart endwise, each miter block being provided with a longitudinal rib $k^5$, and said work-holder being provided with longitudinal grooves $k^2$ adapted to engage said ribs, substantially as set forth.

11. In a machine of the class specified, the combination of a pair of endless traveling link-belts, sprockets for said link belts, split hand-wheels applied to the sprockets of one of said link belts, and threaded shafts supporting said sprockets.

12. A machine for making wire-bound box-blanks, comprising parallel link-belts, pockets in said belts for carrying cleats end to end, adapted to prevent lateral displacement of the cleats, means in said belts for spacing the cleats apart endwise, stationary guides in which said link-belts are supported against lateral displacement, means on said belts for positioning sheet material on said cleats, means for applying binding wires to flexibly connect together the cleat reinforced sections of each blank, and means for suitably moving said belts in said guides.

13. A machine for making wire-bound and cleat-reinforced box-blanks, comprising a plurality of link-belts, means on said belts for spacing the cleats apart endwise, means on said belts for preventing lateral displacement of said cleats, spacers on said belts for separating the edges of the sheet material on said cleats, means for suitably operating said belts, and means for applying binding wires to flexibly connect together the spaced or separated sections of each blank.

14. A machine for making wire-bound box-blanks, comprising link-belts, pockets in said belts for holding the cleats end to end, adapted to prevent lateral displacement of said cleats, means for spacing the cleats apart endwise, guides in which said belts are supported, means for operating said belts in said guides, means for applying binding wires to flexibly connect together the sections of each blank, and means for laterally shifting one belt and its guide to change the width of the blanks.

15. A machine for making wire-bound box-blanks, comprising endless link-belts provided with pockets for holding cleats end to end, adapted to space the cleats apart endwise and prevent lateral displacement of the same therefrom, means on said belts for spacing apart the sheet material on said cleats, means for suitably actuating said belts intermittently to successively bring the blanks into position, and means for applying binding wires to flexibly connect together the slightly separated sections of each blank thus brought into position by said belts.

16. In a machine of the class specified, a plurality of link-belts provided with instrumentalities for holding cleats end to end, adapted to space the cleats apart endwise and prevent lateral displacement of the same, and means on said belts for separating the edges of sheet material on said cleats.

Signed by me at St. Joseph, Berrien county, Mich., this 14th day of August 1906.

EDWARD CRAIG.

Witnesses:
CHAS. W. STRATTON,
HELEN C. CLARKE.